No. 841,850. PATENTED JAN. 22, 1907.
J. R. CRABILL.
VARIABLE FRICTION GEAR.
APPLICATION FILED MAR. 26, 1906.

Witnesses:
E. J. McAnulty
James H. Gibson

Inventor
Joseph R. Crabill

UNITED STATES PATENT OFFICE.

JOSEPH R. CRABILL, OF CARTHAGE, ILLINOIS.

VARIABLE FRICTION-GEAR.

No. 841,850.     Specification of Letters Patent.     Patented Jan. 22, 1907.

Application filed March 26, 1906. Serial No. 307,987.

*To all whom it may concern:*

Be it known that I, JOSEPH R. CRABILL, a citizen of the United States, residing at Carthage, in the county of Hancock and State of Illinois, have invented a new and useful Variable Friction-Gear, of which the following is a specification.

My invention relates to power-transmitting mechanism particularly adapted for use in common road-automobiles; and it consists of a number of friction disk-wheels arranged around a friction roller-wheel, all of the friction disk-wheels imparting motion to the friction roller-wheel by its bearing on their faces, increasing frictional efficiency in proportion to the number of friction disk-wheels used, and means for controlling the frictional contact of the several frictional parts by imposing one against the other, the manner of holding the friction roller-wheel in place against the friction disk-wheels, also gearing the different friction disk-wheels together with idler-wheels for transmitting power from one friction disk-wheel to another, and also controlling the direction of the auxiliary friction disk-wheel, causing them to rotate positively in union and in the same direction, and also the forms of the face of the friction disk-wheels for protecting the face of the friction roller-wheel in such service as requires such protection, and has for its objects, first, an instant or gradual release of power transmitted; second, a variation of speed transmitted to drive wheels from uniform speed of motor, utilizing the physical axiom, "That which is gained in power is lost in speed," and vice versa, giving more power and less speed in going uphill and on bad roads or more speed and less power on good roads, thus maintaining economical relation between motor and power and speed of drive-wheels; third, to provide means for instant reversal of motion of the drive-wheels with continuous forward motion of motor; fourth, to provide a simple and compact combination of frictional and subsidiary toothed gearing assembled in suitable framework with controlling-levers, producing a unit in machine elements that is complete in itself to be applied to automobiles of every character and to feed gearing of woodworking machinery, elevating appliances, and all other industrial machinery whatsoever that requires a variable-speed motion.

These objects are attained and consist of mechanism illustrated and shown in the accompanying drawings, which is part of this specification, in which similar letters of reference refer to similar parts throughout the several views.

Figure 3:
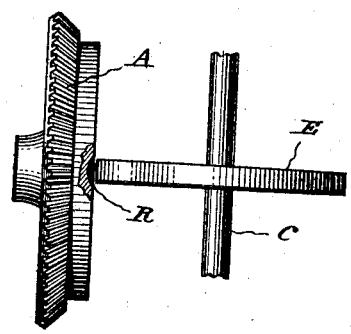
Figure 2:
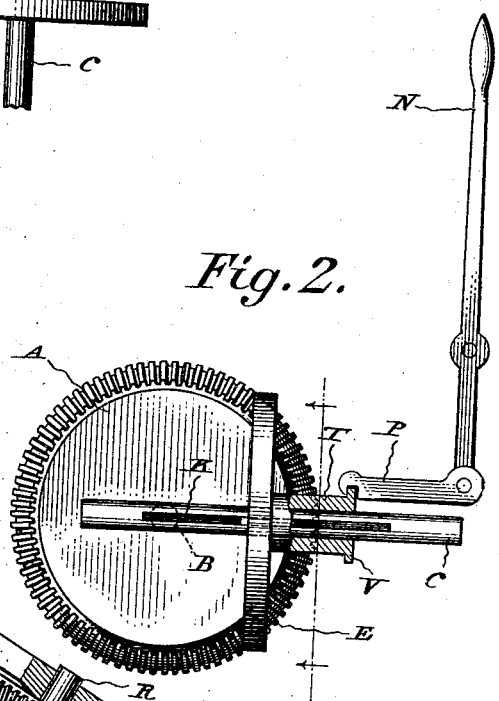
Figure 1:
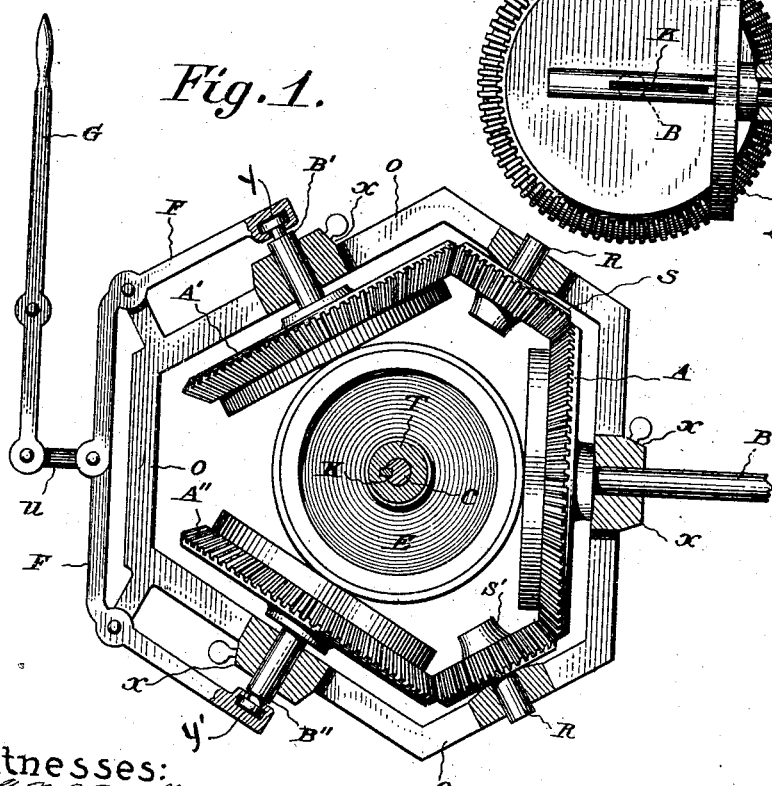

In the drawings, Figure 1 is an end view of my device embodying my invention. Fig. 2 is a side view of the same, showing one of the friction disk-wheels, the friction roller-wheel, and its carrying-shaft and controlling device. Fig. 3 is a plan view of one of the friction disk-wheels, showing a depression in the center of the friction disk-wheels.

In describing my device I adopt and show in the drawings a machine with three friction disk-wheels A, A', and A'' with beveled toothed gearing on their peripheries, their faces forming the sides of a triangular figure surrounding a friction roller-wheel as being particularly suitable for an automobile and in a device in which the power comes from the motor to the friction-gear through shaft B and from the friction-gearing to the axle of the drive-wheels of the automobile through the shaft C, that carries the friction roller-wheel E.

For the sake of description I designate the friction disk-wheel A as the "main" friction disk-wheel and the other two friction disk-wheels A' and A'' as "auxiliary" disk-wheels.

The auxiliary friction disk-wheels exert the same amount of power to the friction roller-wheel E as the main friction disk-wheel A, as they are geared to one another by suitable toothed gearing at their circumferential edges and suitable toothed idler-wheels S and S' between them gearing them together, causing them to rotate positively in unison and in the same direction in relation to the faces of the several friction disk-wheels A, A', and A'' and all imparting power and rotating motion to the friction roller-wheel E. The three friction disk-wheels A, A', and A'' are so set that lines drawn parallel with each other and across the plane of the faces of each of said friction disk-wheels are parallel with the shaft C, which carries upon it a friction roller-wheel in contact with and movable across the faces of the said friction disk-wheels, and the axes of the friction disk-wheels A, A', and A'' are all set in the same plane and pointing approximately to one common center, thus permitting the friction roller-wheel E to pass freely across the center of their faces and have equal contact at any point it may be placed by the operator through the lever N and connecting-bar P, that engages with the collar V on the sleeve T, which is fixed rigidly to the friction roller-wheel E.

The three friction disk-wheels A, A', and A'' are set in a triangular position, as shown in Fig. 1, and are held in place by a framework O O O O by suitable journals and boxes X X X with proper oilers. Fig. 1 also shows the turnable toothed idler-wheels A and A', journaled at R and R' in suitable boxes fixed to the framework and arranged and located between and with their teeth engaging with the teeth at the periphery of a pair of the friction disk-wheels A, A', and A'', causing all to rotate positively in unison and in one direction. Thus each of the friction disk-wheels impart power to the friction roller-wheel E at the different places of contact with the several friction disk-wheels A, A', and A''.

The carrying-shaft C of the friction roller-wheel E in a device with a group of friction disk-wheels located with the plane of their faces at angles with one another requires no journal or carrying boxes at its end which carries the friction roller-wheel E, as the sides of the circumscribing polygonal figure formed by the angles of the faces of the several friction disk-wheels A, A', and A'' confine the friction roller-wheel to its proper place between them and the friction roller-wheel E acts as a roller-bearing between the circumscribing friction disk-wheels A, A', and A'', as well as receiving power at the points of contact with the friction disk-wheels.

The frictional contact is varied by one of the levers F or F' or by both levers F and F', as is desired, by adjusting one or all of the auxiliary friction disk-wheels to or from the friction roller-wheel E through link U and lever G by the operator.

The lever F or levers F and F' are shown connected to the shaft B' and B'' of the auxiliary friction disk-wheels by a non-parting step Y an Y' to adjust them against or pull them away from the friction roller-wheel E when the auxiliary friction disk-wheels are so located that gravity effects the perfect disengagement of the frictional contact.

The speed relation between the friction disk-wheels A, A', and A'' and friction roller-wheel E is varied by moving friction roller-wheel E on its shaft C by the operator by lever N through connecting-bar P, collar V, and sleeve T to such positions on shaft C that it will be nearer to the center or nearer to the circumference of the friction disk-wheels A, A', and A'', depending upon whether the operator wishes to increase or decrease the speed of the part of the machine driven by the variable-speed device, as with a friction-gear with one friction disk-wheel only.

Fig. 3 is a sectional view of an improved friction disk-wheel of one of the friction disk-wheels A or A' or A'', showing a slight depression R in the center of its face with a concavity about equal to the circumferential face of friction roller-wheel E and with a diameter about equal to the thickness of friction roller-wheel E for incidentally disengaging the friction-surface of the friction disk-wheel and other auxiliary friction disk-wheels that may be used, and the friction roller-wheels E when it passes over the center of the friction disk-wheel in reversing the rotation of the friction roller-wheel E, thereby eliminating the grinding effect between the center of the friction disk-wheel and the face of friction roller-wheel E.

In working out and developing my invention and adapting it to the many kinds of automobiles, bicycles, and various other machinery I do not contemplate the use of a three-disk variable-friction gear only; but any number of auxiliary friction disk-wheels may be used, that may be arranged around a friction roller-wheel and geared together by suitable idler-wheels.

I do not claim as new the simple form of friction disk-wheel and friction roller-wheel in a friction-gear producing variable and reverse motion by changing the friction roller-wheel from one point to another in a line across the center of the face of friction disk-wheel in and in line with friction roller-wheel, nor any framework that contains any of the parts of simple friction disk-wheel and friction roller-wheel in any form, and any necessary framework to carry a multiplicity of main and auxiliary friction disk-wheels that are geared together by idlers of suitable form to show a complete device or the ordinary framework of an automobile may be used to hold the parts together; nor do I claim as my invention the lever N for controlling the speed or reversal of rotation of the friction roller-wheel E, nor their connection together by sleeve T and connecting-bar P, nor any particular form of lever F and F' or framework to move and increase or decrease the size of the polygonal figure formed by the faces of the several friction disk-wheels; but What I do claim, and desire to secure by Letters Patent is—

1. Variable-speed and reversible friction-gearing comprising a roller-wheel E, the main friction disk-wheel A with toothed gearing on its periphery, two auxiliary friction disk-wheels A' and A'' with toothed gearing on their periphery, all of said friction disk-wheels having axes lying in the same plane and pointing approximately to one common center, with the plane of their faces lying at angles with one another and forming the sides of a triangular figure surrounding and in contact with the friction roller-wheel E, toothed idler-wheels S and S' located one on either side of and meshing into the main friction disk-wheel and between it and one of the auxiliary friction disk-wheels A' A'' gearing the three friction disk-wheels A, A' and A'' together for rotating them in unison whereby each of the wheels A, A' and A'' act upon the wheel E with the same power and in the same direction.

2. Variable-speed and reversible friction-gearing comprising a friction roller-wheel E, a main disk-wheel A with toothed gearing on its periphery, a plurality of auxiliary friction disk-wheels with toothed gearing on their periphery, all of them having axes lying in the same plane and pointing approximately to one common center, with the plane of their faces lying at angles with one another and forming the sides of an angular figure surrounding and in contact with the friction roller-wheel; said friction disk-wheels geared together by suitable toothed idler-wheels alternated between them and rotating them in unison whereby each of the several friction disk-wheels act upon the friction roller-wheel with the same power and in the same direction, as set forth.

3. In a variable-speed and a reversible frictional driving mechanism a friction roller-wheel, a main friction disk-wheel and a plurality of auxiliary friction disk-wheels surrounding the friction roller-wheel; the several friction disk-wheels arranged with faces at angles with one another, located in such positions that their faces form some of the sides of an irregular polygon surrounding and each in contact with said friction roller-wheel; the auxiliary friction disk-wheels, located on suitable framework and boxes with their shafts journaled therein, means of controlling the same so as to increase or decrease the radii of the said polygonal figure by moving them in a direction of their axes toward the friction roller-wheel to increase the contact and from it to decrease the contact on the friction roller-wheel as described.

JOSEPH R. CRABILL.

Witnesses:
JAMES F. GIBSON,
ANNA G. DAVIS.